United States Patent [19]

Hundebøl

[11] Patent Number: 5,614,016
[45] Date of Patent: Mar. 25, 1997

[54] METHOD AND PLANT FOR MANUFACTURING CEMENT CLINKER

[75] Inventor: Søren Hundebøl, Copenhagen, Denmark

[73] Assignee: F.L. Smidth & Co. A/S, Denmark

[21] Appl. No.: 535,285

[22] PCT Filed: May 27, 1994

[86] PCT No.: PCT/DK94/00207

§ 371 Date: Oct. 19, 1995

§ 102(e) Date: Oct. 19, 1995

[87] PCT Pub. No.: WO94/29231

PCT Pub. Date: Dec. 22, 1994

[30] Foreign Application Priority Data

Jun. 3, 1993 [DK] Denmark .................................. 632/93
Feb. 3, 1994 [DK] Denmark .................................. 145/94

[51] Int. Cl.⁶ ............................... C04B 7/43; F27B 7/00
[52] U.S. Cl. ....................... 106/745; 106/747; 106/756; 106/759; 106/761; 106/771; 432/13; 432/14; 432/58; 432/106; 432/139
[58] Field of Search .................................. 106/761, 771, 106/745, 747, 756, 759; 432/13, 14, 106, 139, 58

[56] References Cited

U.S. PATENT DOCUMENTS

| | | | |
|---|---|---|---|
| 1,627,553 | 5/1927 | Fasting | 106/761 |
| 4,105,460 | 8/1978 | Gottlieb | 106/761 |
| 4,191,586 | 3/1980 | Dambrine | 106/761 |
| 4,248,641 | 3/1981 | Deussner | 106/761 |
| 4,381,916 | 5/1983 | Warshawsky | 106/761 |
| 4,627,877 | 12/1986 | Ogawa et al. | 106/761 |
| 4,878,949 | 11/1989 | Unland et al. | 106/761 |
| 5,199,987 | 4/1993 | Ernstbrunner | 106/761 |
| 5,413,635 | 5/1995 | Matweecha et al. | 106/761 |

FOREIGN PATENT DOCUMENTS

| | | | |
|---|---|---|---|
| 0488989 | 6/1992 | European Pat. Off. | C04B 7/44 |
| 0582394 | 2/1994 | European Pat. Off. | F23G 5/08 |
| 3542004 | 6/1987 | Germany | F23G 5/04 |
| 2155159 | 9/1985 | United Kingdom | 106/761 |

OTHER PUBLICATIONS

"Burning Sewage Sludge In Cement Kilns", pp. 57–64, *World Cement*, vol. 18, No. 2, Mar. 1987.

Primary Examiner—Anthony Green
Attorney, Agent, or Firm—Brumbaugh, Graves, Donohue & Raymond

[57] ABSTRACT

A method and plant for burning sludge or filter cakes during the cement clinker manufacture where the cement is manufactured in known manner by the cement raw meal being preheated, calcined and burned into clinker with subsequent cooling of the clinker and where the sludge is dried and finely divided prior to burning. The drying heat is provided by feeding hot raw meal from either the preheater or a separating cyclone installed in connection with the calciner to the drier unit, which may be a drier crusher. Applicable types of sludge include sewage sludge, beaching earth, paper sludge, fibre rejects, combustible chemical residues, e.g. waste derived from the manufacture of nylons and pesticides, and drill sludge resulting from oil exploration.

14 Claims, 2 Drawing Sheets

METHOD AND PLANT FOR MANUFACTURING CEMENT CLINKER

BACKGROUND OF THE INVENTION

The present invention relates to a method and plant for burning sludge or filter cakes when manufacturing cement clinker, by which method cement raw meal is preheated, calcined and burned into clinker which is subsequently cooled, and where the sludge is dried and finely divided prior to burning.

In connection with the manufacturing of cement it is often necessary to dry and crush raw materials, e.g. clay and chalk, which are constituent parts of the cement. For this process, where the water percentage in the raw materials may be as high as 30%, it is established practice to use a drier crusher, which may be a hammer crusher, with a hot gas stream being continuously drawn through this crusher. This drying gas may either be exhaust gases from the kiln, which are normally available at temperatures around 350°–400° C., or air heated in a separate heat generator.

Burning of sewage sludge after the sludge has been subjected to a drying process in connection with cement manufacture is known i.a. from an article in "World cement"; March 1987; Obrist, A.; "Burning sludge in cement kilns", which describes the inherent advantages and disadvantages of burning. With regard to the burning process itself, it is stated (page 57, column 2, last section) that a treatment of the sludge is required prior to burning, particularly in order to reduce the very high water content of about 96% present in the sludge in the crude state.

A mechanical dehydration may reduce the water content to a level of 55–75%, but the sludge is still not suitable for burning, and additional thermal drying is therefore required in order to reduce the water percentage to about 5–25%, whereafter the form of the sludge is such that it can be burned in the kiln or in the calciner. The article does not mention any specific method of drying.

The Danish patent application No. 2829/90 filed on Nov. 29, 1990, suggests a method for burning paper sludge in connection with the burning of cement clinker. According to this patent specification the paper sludge is mixed with the cement raw materials in a suspension which is subsequently fed to a rotary kiln which is operating according to the wet-process method. The wet process is no longer extensively used for cement manufacturing, and prior drying and, in some cases, a fine division will be required to feed raw materials with such a high water content directly into a kiln which is operating according to the dry process. As a result, an effective, and preferably energy-saving, drying process is needed to treat the sludge before it is fed to kiln or calciner.

Current methods of drying which consists of bringing the wet sludge into contact with hot exhaust gas has the disadvantage that they result in substantial volumes of used drying exhaust gas which may contain malodorous and even toxic constituents, hence necessitating comprehensive and expensive cleaning methods in connection with the release into the atmosphere.

Oil sludge, e.g. residues from disused oil tanks, receiving stations in harbours for used engine oil and residues originating from the scrapping of automobiles etc., is a different type of sludge which must be subjected to a treatment before the calorific value of the sludge can be utilized, and for treatment of such sludge is known a mobile plant (EWOC 240, EWOC Ltd.) which, by means of calcium oxide, converts the oil sludge into a brown, free-flowing powder. During the process in this plant, burned lime is mixed into the oil sludge to heat it up, to boil off the water and to neutralize acid constituents. However, burned lime is relatively expensive, and another complication of the process is that vapour is formed which contains organic constituents which cannot be released to the atmosphere in an environmentally acceptable manner without prior treatment.

SUMMARY OF THE INVENTION

It is therefore the object of the present invention to provide a method for burning of sludge or filter cakes during the manufacture of cement clinker, by which method the drying gas volume is substantially reduced, thereby necessitating smaller dimensions of ducts and drier unit. Due to the fact that the drying gas after the drier unit is simultaneously directed to kiln or calciner, an effective destruction of combustible, malodorous and potentially toxic substances is further achieved.

In a special embodiment of the invention a drier crusher is utilized as a drier unit, this being particularly advantageous since the technology in relation to drier crushers is well-known and field-proven and since drier crushers have already been installed at many plants where it will be relatively simple to modify the type and supply of the feed material.

BRIEF DESCRIPTION OF THE DRAWINGS

The invention will now be explained in further details by means of two examples of embodiment of a plant according to the invention and with reference to the drawing, where.

BRIEF DESCRIPTION OF THE PREFERRED EMBODIMENTS

Figure 1:
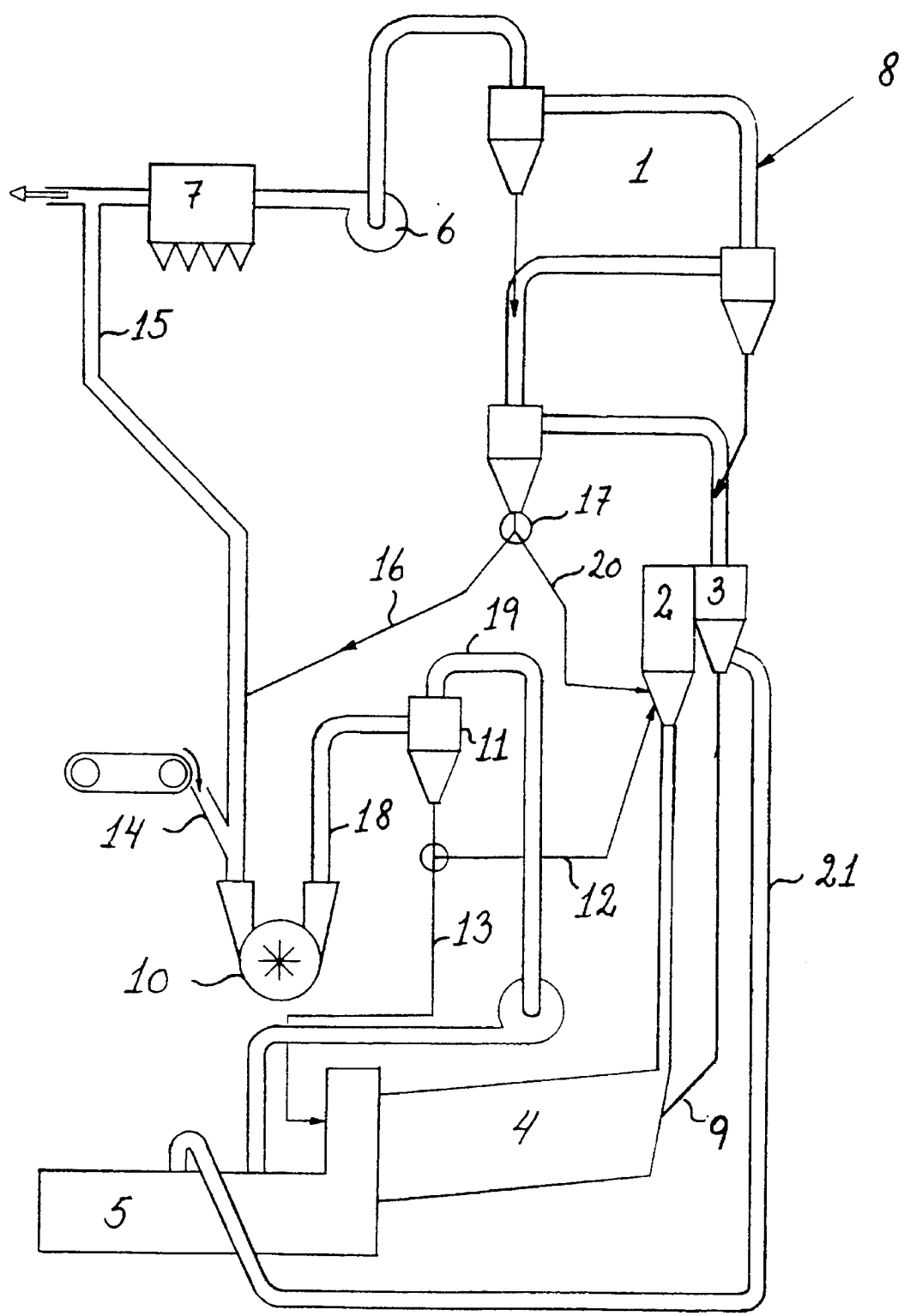
FIG. 1 shows a plant according to the invention in which a fine division of the sludge is carried out during the drying process.
Figure 2:
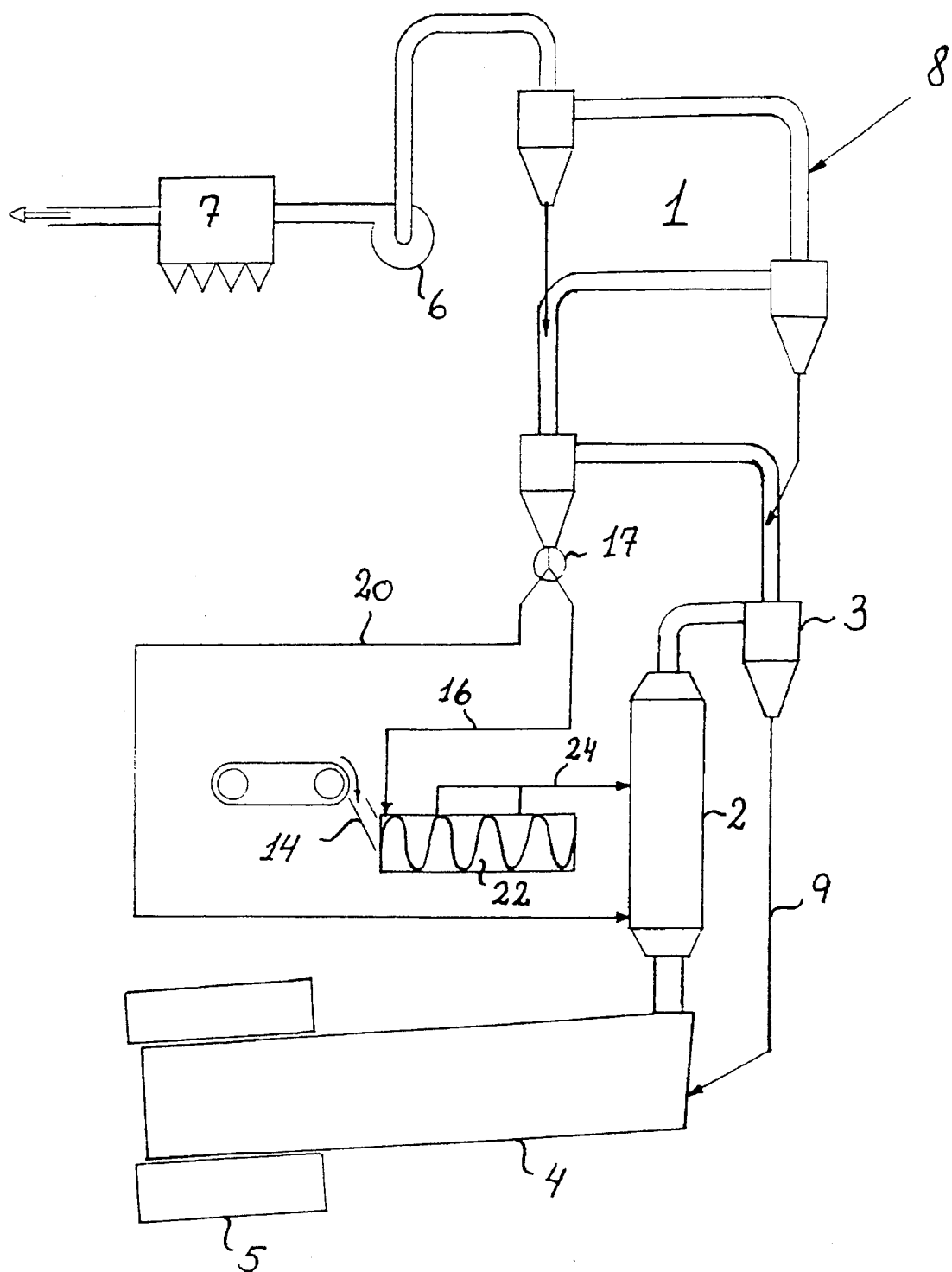
FIG. 2 shows a plant according to the invention which is particularly suitable for treatment of types of sludge which do not require any special grinding prior to incineration

FIGS. 1 and 2 show a cement kiln plant of the generally known type which comprises a preheater 1, which in the figure consists of three cyclones, a calciner 2 with a separation cyclone 3 and a rotary kiln 4 with clinker cooler 5. After the preheater—in the direction of exhaust gas passage—an exhaust gas fan 6 and an exhaust gas filter 7 are located.

In a plant of the kind mentioned above, cement is manufactured by introducing cement raw meal at the inlet 8 at the top of the preheater 1 with the raw meal being led through the preheater in counterflow with the exhaust gases from the kiln 4 and the calciner 2. The exhaust gases are led up through the preheater 1 by means of the exhaust gas fan 6 and discharged through the exhaust gas filter 7. In this way the raw meal is heated and conveyed from the preheater 1 via a duct 20 down into the calciner 2 where it is calcined and then passed in suspended form to the separating cyclone 3. Here the calcined raw meal is separated from the exhaust gases and conveyed via a duct 9 to the rotary kiln 4 in which the raw meal is burned into clinker in known manner. The clinker falls down into the cooler 5 in which it is cooled by means of air.

In FIG. 1 a drier crusher 10 is installed in parallel with the preheater and it is connected via a duct 18 to a subsequent cyclone 11 to which the dried and finely divided mixture of sludge and raw meal is conveyed by means of a gas stream. The gas stream for the drier crusher consists of the exhaust gases which flow up through the preheater 1 and may be extracted from the plant at the most appropriate location. In the figure the exhaust gases are extracted after the exhaust gas filter 7 where the exhaust gas temperature is around 300° C. and carried to the drier crusher via a duct 15. The drier crusher further receives hot raw meal having an appropriate temperature from the preheater 1, via a duct 16. The hot raw meal may also be extracted from the bottom of the separating cyclone 3 which is installed in connection with the calciner 2.

The exit gas, with a temperature of approximately 150° C., which is discharged from the cyclone 11 and which may contain malodorous and toxic compounds may be directed to the rotary kiln 4 via a duct 19, possibly through a detour via the cooler 5 (as shown in the figure) thereby ensuring that the exhaust gases are effectively mixed with hot combustion air. The organic compounds are effectively destructed in the burning zone of the rotary kiln where the temperature is higher than 1400° C. Alternatively, the exit gas from cyclone 11 may be directed to the calciner 2 (not shown in the figure), although this may result in a less effective destruction of the single organic compounds since the temperature in the calciner is typically around 900° C.

The ground and dried sludge constitutes a fuel which may be used as a part-replacement of the ordinary fuel of the rotary kiln or calciner, which may be coal or oil. The dried and 9round sludge may be proportionately fed to the calciner 2 via duct 12 or to the rotary kiln via duct 13, in the latter case the sludge dry matter is introduced through the main burner of the rotary kiln. It will normally be advantageous to use the calciner 2 for the burning process since the mineral constituents of the sludge are hereby effectively mixed with the total flow of raw meal in the calciner, hence ensuring a homogeneous raw mix feed to the rotary kiln. Injection of the sludge dry matter into the rotary kiln 4 is possible only for smaller tonnages, since problems resembling those encountered when firing ash-rich coal in the rotary kiln will occur, viz. a retarded mixture of the raw material components prior to clinkerization.

In order to reduce the gas flow in the rotary kiln 4, a duct 21 is provided for supplying tertiary air from the cooler 5 to the combustion process in the calciner 2.

A separator may be installed after the drier crusher 10 and prior to the cyclone 11 thereby making it possible to separate the dried and finely divided mixture of raw meal and sludge into a finely and coarsely ground particle fraction. The coarse fraction is returned to the drier crusher and the fine fraction is passed on to the cyclone 11.

The sludge is fed to the drier crusher via a duct 14. The sludge will normally have a water content of about 50–70% and will contain up to about 80% water for mechanically dehydrated sewage sludge, but, in principle, there is no upper limit to the water content of the sludge which may be used in the process. Applicable types of sludge include for example sewage sludge, bleaching earth, paper sludge, fibre rejects, combustible chemical residues, e.g. waste derived from the manufacture of nylons and pesticides, drill sludge resulting from oil exploration and similar types.

A splitter gate 17 is fitted in connection with the outlet 16 for raw meal to the drier crusher so that it is possible to control the raw meal feed rate to the drier crusher, which depends on the water content of the sludge and the quantity of raw meal being fed along the normal route via the duct 20 directly to the calciner 2.

The raw meal temperature is about 750°–880° C. on arrival to the drier crusher, this being dependent on whether it has been extracted from the preheater 1 or separating cyclone 3, and the raw meal supplies the main part of the energy which is used to dry the sludge in the drier crusher.

So, when the exhaust gas stream is not required to provide a complete drying process, as required in conventional plants, it is possible to apply a much smaller gas flow through the drier crusher. This is tantamount to a smaller energy consumption and a reduction of capital costs, since tests have demonstrated that even a relatively large additional input of dry matter through the drier crusher will not cause any significant change in the power consumption or the pressure loss, which means that the dimensions of the drier crusher can be reduced.

The volume flow of used drying gases will also be much smaller, thereby diminishing the disadvantages encountered when drawing drying gases through the rotary kiln or calciner in order to destruct the organic constituents.

In cases where sewage sludge is to be disposed of, a high content of mercury (Hg) in the sludge may make it impossible to carry out combustion in ordinary waste incineration plants. However, use of the drying process according to the invention will offer the advantage of having the Hg content concentrated in a limited volume so that the dimensions of a Hg collecting plant, if incorporated, (installed in connection with duct 19 in the figure) can be substantially reduced.

Of course, this method is not restricted to applications in plants of the shown type (ILC—In Line Calciner). The method may also be advantageously used for ordinary preheater plants with riser duct firing, which, in principle, deviate only from the ILC-plant in that they are not provided with a tertiary air duct 21. Two-string plant types (SLC—Separate Line Calciner) may also be provided with drier crusher(s) according to the same principle.

The example of embodiment in FIG. 2 describes a plant which is particularly suitable for disposal of sludge types, i.a. oil sludge, in which there is no need for any grinding apparatus to perform a fine division of the sludge prior to burning.

In this plant the sludge is directed via a duct 14 and the hot raw meal via a duct 16 to a drier unit 22, which in the figure is shown as a mixing screw conveyor. The exit gas from the drier unit consists of water vapour and evaporated organic substances which are directed via a duct 24 to the calcining zone 2 (or to the kiln 4). The mixture of raw meal and sludge from the drier unit is directed to the calcining zone. Instead of a mixing screw conveyor, other known types of mixing devices may be deployed, including types which may perform a fine division simultaneously with the mixing operation.

We claim:

1. A method for burning sludge or filter cakes during cement clinker manufacture comprising the steps of preheating cement raw meal, calcining the preheated cement raw meal in a calciner, and then burning the calcined cement raw meal in a kiln, said method further comprising drying the sludge or filter cakes by mixing therewith at least a portion of the preheated or calcined cement raw meal thereby drying the sludge or filter cakes at least partially by means of the heat from the preheated or calcined cement raw meal, and thereafter burning the mixture of dried sludge or filter cakes and cement raw meal in the calciner or the kiln.

2. A method according to claim 1, wherein the preheated or calcined raw meal is mixed with the sludge or filter cakes in a drier unit.

3. A method according to claim 2, wherein exit gas from the drier unit is directed to the calciner or to the kiln.

4. A method according to any one of claims 1–3, wherein a fine division of the mixture of raw meal and sludge is carried out during the drying of the sludge or filter cakes.

5. A method according to claim 4, wherein a mixture of dried and finely divided raw meal and sludge or filter cakes emerges from the drier unit and is separated from the exit gas in a cyclone.

6. A method according to claim 5, wherein the mixture of raw meal and sludge or filter cakes which emerges from the drier unit is separated into a coarse and a finely divided grain fraction, whereafter the fine grain fraction and the exit gas is passed on to a cyclone and the coarse fraction is returned to the drier unit.

7. A method according to any one of claims 1, 2 or 3, wherein heat for drying the sludge or filter cakes is provided substantially completely by the preheated or calcined cement raw meal.

8. A method according to any one of claims 1, 2 or 3, wherein the sludge or filter cakes comprise at least one of the group consisting of sewage sludge, beaching earth, paper sludge, fibre rejects, combustible chemical residues, waste derived from the manufacture of nylons and pesticides, and drill sludge resulting from oil exploration.

9. A plant for burning sludge or filter cakes during a cement clinker manufacture, said plant comprising a preheater, a calciner, a kiln and a drier unit in which the sludge or filter cakes can be dried, said drier unit being fitted with an outlet for dried sludge or filter cakes and an inlet for untreated sludge, and wherein the drier unit is further provided with a feed point for preheated or calcined raw meal.

10. A plant according to claim 9, wherein the drier unit has an outlet for the dried sludge or filter cakes for the calciner.

11. A plant according to claim 9, wherein the drier unit has an outlet for the dried sludge or filter cakes for the kiln.

12. A plant according to any one of claims 9, 10 or 11 wherein the drier unit is a drier crusher.

13. A plant according to any one of claims 9, 10 or 11 wherein the drier unit is a mixing screw conveyor.

14. A plant according to any one of claims 9, 10 or 11, wherein the drier unit can finely divide the sludge or filter cakes.

* * * * *